US012018165B2

(12) United States Patent
Moussa

(10) Patent No.: US 12,018,165 B2
(45) Date of Patent: *Jun. 25, 2024

(54) INKS FOR 3D PRINTING HAVING LOW PRINT THROUGH DEPTH

(71) Applicant: 3D Systems, Inc., Rock Hill, SC (US)

(72) Inventor: Khalil Moussa, Chapel Hill, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/326,535

(22) Filed: May 31, 2023

(65) Prior Publication Data

US 2023/0303876 A1 Sep. 28, 2023

Related U.S. Application Data

(63) Continuation of application No. 17/832,129, filed on Jun. 3, 2022, now Pat. No. 11,702,559, which is a continuation of application No. 16/182,926, filed on Nov. 7, 2018, now Pat. No. 11,384,250.

(60) Provisional application No. 62/582,631, filed on Nov. 7, 2017.

(51) Int. Cl.
| | |
|---|---|
| *B33Y 10/00* | (2015.01) |
| *B29C 64/112* | (2017.01) |
| *B29C 64/124* | (2017.01) |
| *B33Y 70/00* | (2020.01) |
| *C09D 11/037* | (2014.01) |
| *C09D 11/101* | (2014.01) |
| *C09D 11/107* | (2014.01) |
| *C09D 11/328* | (2014.01) |
| *C09D 11/38* | (2014.01) |
| *B29K 33/00* | (2006.01) |
| *B29K 105/00* | (2006.01) |

(52) U.S. Cl.
CPC ............ *C09D 11/38* (2013.01); *B29C 64/112* (2017.08); *B29C 64/124* (2017.08); *B33Y 10/00* (2014.12); *B33Y 70/00* (2014.12); *C09D 11/037* (2013.01); *C09D 11/101* (2013.01); *C09D 11/107* (2013.01); *C09D 11/328* (2013.01); *B29K 2033/12* (2013.01); *B29K 2105/0032* (2013.01)

(58) Field of Classification Search
None
See application file for complete search history.

(56) References Cited

U.S. PATENT DOCUMENTS

| | | |
|---|---|---|
| 5,182,056 A | 1/1993 | Spence et al. |
| 8,857,961 B2 | 10/2014 | Lugassi et al. |
| 2005/0053798 A1* | 3/2005 | Maekawa ............ B29C 64/106 264/497 |
| 2010/0140850 A1 | 6/2010 | Napadensky et al. |
| 2011/0262711 A1 | 10/2011 | Chopra et al. |
| 2012/0231232 A1 | 9/2012 | Xu et al. |
| 2012/0251841 A1 | 10/2012 | Southwell et al. |
| 2012/0259031 A1 | 10/2012 | Dake et al. |
| 2014/0017460 A1 | 1/2014 | Xu et al. |
| 2017/0252971 A1 | 9/2017 | Umebayashi |

FOREIGN PATENT DOCUMENTS

| | | |
|---|---|---|
| EP | 2757133 | 7/2014 |
| JP | H31991-211040 | 9/1991 |
| JP | H101998502461 | 3/1998 |
| JP | 2006266718 | 10/2006 |
| JP | 2006-348214 | 12/2006 |
| JP | 2009-173781 | 8/2009 |
| JP | 2013-514551 | 4/2013 |
| WO | 2013037277 | 3/2013 |
| WO | 2015038714 | 3/2015 |

OTHER PUBLICATIONS

PCT International Search Report the International Searching Authority for PCT/US2018/059572, dated Mar. 26, 2019 (6 pages).
PCT Written Opinion of the International Searching Authority for PCT/US2018/059572, dated Mar. 26, 2019 (6 pages).
European Patent Communication for EP Application 22200928.4 dated Jan. 16, 2023 (7 pages).

(Continued)

*Primary Examiner* — Yung-Sheng M Tsui
(74) *Attorney, Agent, or Firm* — Maynard Nexsen PC; John P. Zimmer

(57) ABSTRACT

In one aspect, inks for use with a three-dimensional (3D) printing system are described herein. In some embodiments, an ink described herein comprises up to 80 wt. % oligomeric curable material; up to 80 wt. % monomeric curable material; up to 10 wt. % photoinitiator; up to 1 wt. % non-curable absorber material; and up to 10 wt. % one or more additional components, based on the total weight of the ink, and wherein the total amount of the foregoing components is equal to 100 wt. %. Additionally, the photoinitiator is operable to initiate curing of the oligomeric curable material and/or the monomeric curable material when the photoinitiator is exposed to incident curing radiation having a peak wavelength $\lambda$. Moreover, the ink has a penetration depth ($D_p$), a critical energy ($E_c$), and a print through depth ($D_{PT}$) at the wavelength $\lambda$ of less than or equal to $2 \times D_p$.

18 Claims, No Drawings

(56) References Cited

OTHER PUBLICATIONS

English machine translation of Japanese Application JP20050081563 (Publication No. JP2006266718) retrieved from espacenet.com on Dec. 3, 2021 (17 pages).
English translation of Japanese First Office Action for Japanese Application No. 2020-523784, dated May 25, 2021 (6 pages).
English machine translation of Japanese Unexamined Patent Publication No. JP 2009-173781 (50 pages).
English machine translation of Japanese Unexamined Patent Publication No. JP2006-348214 (24 pages).
European Patent Communication for EP Application 188366680.1 dated May 24, 2022 (4 pages).

* cited by examiner

INKS FOR 3D PRINTING HAVING LOW PRINT THROUGH DEPTH

CROSS REFERENCE TO RELATED APPLICATIONS

This application is a continuation of U.S. patent application Ser. No. 17/832,129, filed Jun. 3, 2022, which is a continuation of U.S. patent application Ser. No. 16/182,926, filed Nov. 7, 2018, now U.S. Pat. No. 11,384,250, issued Jul. 12, 2022, which claims priority pursuant to 35 U.S.C. § 119 to U.S. Provisional Patent Application No. 62/582,631, filed Nov. 7, 2017, each of which is hereby incorporated by reference in its entirety.

FIELD

The present invention relates to inks for use with three-dimensional (3D) printing systems.

BACKGROUND

Some commercially available 3D printers or additive manufacturing systems, such as the Projet™3D Printers manufactured by 3D Systems of Rock Hill, South Carolina, use inks, which are also known as build materials, that are jetted through a print head as a liquid to form various 3D objects, articles, or parts. Other 3D printing systems also use an ink that is jetted through a print head or otherwise dispensed onto a substrate. In some instances, the ink is solid at ambient temperatures and converts to liquid at elevated jetting temperatures. In other instances, the ink is liquid at ambient temperatures. Moreover, in some cases, the ink can be cured following dispensing and/or deposition of the ink onto the substrate. Curing can be achieved using a laser or other source of electromagnetic radiation.

Other 3D printers form 3D articles from a reservoir, vat, or container of a fluid ink or build material or a powdered ink or build material. In some cases, a binder material or a laser or other source is used to selectively solidify or consolidate layers of the ink or build material in a stepwise fashion to provide the 3D article.

In 3D printing systems using curing radiation, the curing radiation can penetrate deeper into the ink than intended or desired. More specifically, the radiation can penetrate deeper than the portion of ink that is intended to be cured or consolidated as part of the printed article structure. Such an undesired, excess cure depth can be referred to as "print through" or "print through depth." The occurrence of print through can be problematic for a number of reasons. First, print through can result in the formation of an undesired "gummy" layer of partially cured ink or build material on certain surfaces of an additive manufacturing system (such as one or more "down surfaces"). Second, print through wastes build material. Third, even at its most benign, print through generally requires compensation in the build process to take into account that some layer or other of the printed article will be different than intended (e.g., different than a corresponding computer aided design or "CAD" file dictates). For example, such deviations can sometimes be accounted or compensated for when creating or selecting a specific CAD file to be used to form a printed article. However, such compensation may not be accurate, leading to part distortion and general loss of printing accuracy. Finally, the occurrence of print through generally introduces a greater number of unknown or imprecise values into a build process. Moreover, the greater the print through, the greater the introduction of error and/or uncertainty. Such uncertainly is of course undesired in an additive manufacturing process.

Therefore, there exists a need for improved methods and inks for 3D printing that have improved print through properties.

SUMMARY

In one aspect, inks for use with a 3D printer are described herein, which, in some embodiments, may offer one or more advantages over prior inks, particularly radiation-curable inks for use in additive manufacturing. For example, inks described herein can be used to print articles with improved accuracy and/or precision. Inks described herein can also reduce the amount of waste associated with an additive manufacturing process. Inks described herein, in some cases, also provide one or more of the foregoing advantages without sacrificing speed of the additive manufacturing process, without sacrificing energy efficiency of the additive manufacturing process, and/or without sacrificing desired mechanical properties of the printed articles. Moreover, inks described herein can be used in a variety of different 3D printers or additive manufacturing systems, such as those based on Stereolithography (SLA), Digital Light Processing (DLP), and Multi-Jet Printing (MJP).

In some embodiments, an ink for use in a 3D printing system described herein comprises up to 80 wt. % oligomeric curable material; up to 80 wt. % monomeric curable material; up to 10 wt. % photoinitiator; up to 10 wt. % non-curable absorber material; and up to 10 wt. % one or more additional components, based on the total weight of the ink. It is to be understood, of course, that the total amount of the oligomeric curable material, monomeric curable material, photoinitiator, non-curable absorber material, and one or more additional components is equal to 100 wt. %. The one or more additional components may include a colorant, an inhibitor, and/or a stabilizing agent.

Additionally, the photoinitiator of an ink described herein is operable to initiate curing of the oligomeric curable material and/or the monomeric curable material when the photoinitiator is exposed to incident curing radiation having a Gaussian distribution of wavelengths and a peak wavelength $\lambda$. Moreover, the ink has a penetration depth ($D_p$) and a critical energy ($E_c$) at the wavelength $\lambda$. The terms $D_p$ and $E_c$ are described in further detail below. The ink also has a print through depth ($D_{PT}$) at the wavelength $\lambda$ of less than or equal to $2 \times D_p$, or less than or equal to $1.5 \times D_p$. The term $D_{PT}$ is described in further detail below. Moreover, in some cases, an ink described herein has a $D_p$ value and an $E_c$ value at the wavelength $\lambda$ that correspond to such a $D_{PT}$ value. For instance, in some embodiments, an ink described herein has a ratio of $D_p$ to $E_c$, in units of ($\mu$m cm$^2$)/mJ, of at least 10 or at least 15. In some cases, the ratio of $D_p$ to $E_c$, in units of ($\mu$m cm$^2$)/mJ, is between 10 and 50, between 10 and 25, between 10 and 15, between 10 and 13, between 15 and 50, between 15 and 30, between 15 and 25, or between 19 and 25. As described in more detail below, it is believed that inks having such properties can provide improved printing performance, including due to improved interaction with incident curing radiation.

In some exemplary embodiments, an ink described herein has a $D_p$ of 60-100 $\mu$m and an $E_c$ of 2-4 mJ/cm$^2$. In other instances, the $D_p$ of the ink is 101-150 $\mu$m, and the $E_c$ of the ink is 4-20 mJ/cm$^2$. In still other cases, the $D_p$ of the ink is 151-200 $\mu$m, and the $E_c$ of the ink is 8-15 mJ/cm$^2$.

As described further below, the amounts of photoinitiator and/or non-curable absorber material included in an ink can be selected to obtain a desired $D_p$, $E_c$, and/or $D_{PT}$ value, in combination with other components of the ink. In some embodiments, for example, an ink described herein comprises up to 5 wt. % photoinitiator and up to 2 wt. % or up to 1 wt. % non-curable absorber material. Additionally, in some instances, the total absorbance of the non-curable absorber material at the wavelength λ is about 0.1 to 10 times the total absorbance of the photoinitiator at the wavelength λ. Further, in some cases, both the non-curable absorber material and the photoinitiator of an ink described herein have an absorption peak within 30 nm of the wavelength λ.

In another aspect, methods of forming a 3D article by additive manufacturing are described herein. In some embodiments, such a method comprises providing an ink described herein and selectively curing a portion of the ink using incident curing radiation having a Gaussian distribution of wavelengths and a peak wavelength at the wavelength λ. For example, in some instances, the ink has a print through depth ($D_{PT}$) at the wavelength λ of less than or equal to $2 \times D_p$, and/or a ratio of $D_p$ to $E_c$, in units of (μm cm²)/mJ, between 10 and 50. Additionally, in some embodiments of a method described herein, the ink is selectively cured according to preselected computer aided design (CAD) parameters, and the $D_p$ corresponds to a voxel depth of the CAD parameters.

Moreover, in some cases, providing the ink comprises selectively depositing layers of the ink in a fluid state onto a substrate to form the three-dimensional article. Alternatively, in other embodiments, providing the ink comprises retaining the ink in a fluid state in a container, and selectively curing a portion of the ink comprises selectively applying the curing radiation to the ink in the container to solidify or consolidate at least a portion of a first fluid layer of the ink, thereby forming a first solidified or consolidated layer that defines a first cross-section of the article. Such a method may also further comprise raising or lowering the first solidified layer to provide a second fluid layer of the ink at a surface of the fluid ink in the container, and selectively applying the curing radiation to the ink in the container to solidify at least a portion of the second fluid layer of the ink, thereby forming a second solidified layer that defines a second cross-section of the article, the first cross-section and the second cross-section being bonded to one another in a z-direction. As described further hereinbelow, the foregoing steps may be repeated any desired number of times needed to complete the 3D article.

In still another aspect, printed 3D articles are described herein. Such an article can be formed from any ink and using any method described herein. Such printed 3D articles, in some cases, have superior accuracy compared to some other 3D articles.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 5, or 4 to 10, or 3 to 7, or 5 to 8.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Inks for 3D Printing

In one aspect, inks for use with a 3D printer are described herein. In some embodiments, an ink described herein comprises up to 80 wt. % oligomeric curable material, up to 80 wt. % monomeric curable material, up to 10 wt. % photoinitiator, up to 10 wt. % non-curable absorber material, and up to 10 wt. % one or more additional components. The foregoing weight percents are based on the total weight of the ink. Additionally, as understood by one of ordinary skill in the art, the total amount of the oligomeric curable material, monomeric curable material, photoinitiator, non-curable absorber material, and one or more additional components is equal to 100 wt. %. Moreover, the photoinitiator is operable to initiate curing of the oligomeric curable material and/or the monomeric curable material when the photoinitiator is exposed to incident curing radiation having a peak wavelength λ. That is, the photoinitiator is a photoinitiator of curing of the oligomeric curable material and/or the monomeric curable material. Further, the ink has a penetration depth ($D_p$) and a critical energy ($E_c$) at the wavelength λ. The ink also has a print through depth ($D_{PT}$) at the wavelength λ of less than or equal to $2 \times D_p$.

As understood by one of ordinary skill in the art, $D_{PT}$ refers to the total cure depth minus layer thickness, where the "total cure depth" refers to the depth at which any curing or polymerization of the ink occurs in response to the incident curing radiation. "Layer thickness" refers to the thickness of the region in which "full" curing or polymerization or curing of the ink occurs in response to the incident curing radiation. Such "full" curing refers to the maximum curing provided by the incident radiation. For example, in some cases, "full" curing corresponds to 80-100% curing, 80-95% curing, 80-90% curing, 85-100% curing, 85-99% curing, 85-95% curing, 90-100% curing, 90-99% curing, or 90-95% curing, where the percentage is based on the total number of available curable moieties.

In some cases, an ink described herein has a $D_{PT}$ at the wavelength λ of less than or equal to $1.5 \times D_p$, less than or equal to $1.3 \times D_p$, less than or equal to $1.2 \times D_p$, or less than or equal to $1.1 \times D_p$. In some instances, the $D_{PT}$ at the wavelength λ is between $0.8 \times$ and $2 \times D_p$, between $0.8 \times$ and $1.5 \times D_p$, between $0.9 \times$ and $2 \times D_p$, between $0.9 \times$ and $1.8 \times D_p$, between $0.9 \times$ and $1.5 \times D_p$, between $0.9 \times$ and $1.3 \times D_p$, between $1 \times$ and $2 \times D_p$, between $1 \times$ and $1.7 \times D_p$, between $0.1 \times$ and $1.5 \times D_p$, between $1.1 \times$ and $2 \times D_p$, between $1.1 \times$ and $1.5 \times D_p$, between $1.2 \times$ and $2 \times D_p$, between $1.2 \times$ and $1.8 \times D_p$, between $1.3 \times$ and $2 \times D_p$, between $1.3 \times$ and $1.7 \times D_p$, or between $1.5 \times$ and $2 \times D_p$.

Not intending to be bound by theory, it is believed that an ink having such a $D_{PT}$ value provides improved consistency, accuracy, and resolution when used as a build material in an additive manufacturing process, including an additive manufacturing process described herein. An ink described herein is further believed to reduce waste of build material and/or reduce or eliminate the occurrence of an undesired "build up" or "gummy" residue or layer on a surface of an additive manufacturing system following completion of an additive manufacturing process. Such residues can be especially undesired on so-called "down surfaces" of 3D printing systems.

Moreover, in some cases, an ink described herein has a $D_p$ value and an $E_c$ value at the wavelength λ that correspond to a $D_{PT}$ value described above. For instance, in some cases, an ink described herein has a ratio of $D_p$ to $E_c$, in units of (μm cm²)/mJ, of at least 10 or at least 15. In some embodiments, the ratio of $D_p$ to $E_c$, in units of (μm cm²)/mJ, is between 10 and 50, between 10 and 25, between 10 and 15, between 10 and 13, between 15 and 50, between 15 and 30, between 15 and 25, or between 19 and 25. Such $D_p/E_c$ values can provide $D_{PT}$ values corresponding to those above.

In one "regime," for instance, the $D_p$ of the ink is 60-100 μm, and the $E_c$ of the ink is 2-4 mJ/cm². In other exemplary embodiments, the $D_p$ of the ink is 101-150 μm, and the $E_c$ of the ink is 4-20 mJ/cm². In still other cases, the $D_p$ of the ink is 151-200 μm, and the $E_c$ of the ink is 8-15 mJ/cm².

Further, in some embodiments, an ink described herein has an $E_c$ value that permits energy-efficient and/or rapid additive manufacturing using the ink as a build material. For example, in some cases, an ink described herein has an $E_c$ of no greater than 60 mJ/cm², no greater than 50 mJ/cm², no greater than 40 mJ/cm², no greater than 20 mJ/cm², or no greater than 10 mJ/cm². In some instances, an ink described herein has an $E_c$ of 1-30 mJ/cm², 1-20 mJ/cm², 1-15 mJ/cm², 1-10 mJ/cm², 2-25 mJ/cm², 2-20 mJ/cm², 2-15 mJ/cm², 2-10 mJ/cm², 2-15 mJ/cm².

Similarly, an ink described herein, in some cases, has a $D_p$ value that permits high resolution and/or rapid additive manufacturing using the ink. In some cases, for instance, an ink described herein has a $D_p$ of 50-200 μm, 60-150 μm, 70-150 μm, or 70-100 μm.

Additionally, it is to be understood that the parameters or properties $D_p$, $E_c$, and $D_{PT}$ are structural parameters or properties of an ink described herein. A discussion of the "structural" or "compositional" nature of these values can be found, for instance, in Chapter 4 of Paul F. Jacobs, *Rapid Prototyping & Manufacturing: Fundamentals of Stereolithography* (Society of Manufacturing Engineers, McGraw-Hill, 1992) (first edition) (hereinafter referred to as "Jacobs"). As understood by one of ordinary skill in the art, the value $D_p$ is the penetration depth of the ink, defined as that depth of the ink which results in a reduction of the irradiance to a level equal to 1/e of the surface irradiance, where e is the base of natural logarithms (equal to 2.7182818 . . . ). $E_c$ is the critical energy, which is the energy needed to obtain the gel point of an ink, as described on page 86 of Jacobs. Moreover, as further described by Jacobs (pages 86-89), the metric $E_c$ is equal to the intercept of a working curve corresponding to a semilog plot of cure depth on the ordinate and the logarithm of maximum radiation exposure on the abscissa. $E_c$ is assigned to the intercept, at which the cure depth is zero.

It is further to be understood that the amounts of photoinitiator and/or non-curable absorber material included in an ink described herein can be selected to obtain a desired $D_p$, $E_c$, and/or $D_{PT}$ value, in combination with other components of the ink. However, it is to be understood that, in some instances, the other components of the ink, such as the oligomeric and monomeric curable materials, can vary in type and/or in quantity without substantially changing the desired $D_p$, $E_c$, and/or $D_{PT}$ values obtained by the particular combination of photoinitiator and/or non-curable absorber material. For instance, in some cases, changes in the type and/or quantity of the oligomeric and monomeric curable materials (within the scope of the presently disclosed types and quantities) affect the $D_p$, $E_c$, and/or $D_{PT}$ values of an ink by 5% or less, 4% or less, 3% or less, 2% or less, or 1% or less. More particularly, such minimal changes in the $D_p$, $E_c$, and/or $D_{PT}$ values can be obtained when the components of the ink other than the photoinitiator and non-curable absorber material (such as the oligomeric curable material and/or monomeric curable material) do not absorb (or refract or reflect) or only minimally absorb (or refract or reflect) light of the wavelength λ. Alternatively, such minimal changes in the $D_p$, $E_c$, and/or $D_{PT}$ values can also be obtained when the components of the ink other than the photoinitiator and non-curable absorber material (such as the oligomeric curable material and/or monomeric curable material) absorb (or refract or reflect) light of the wavelength λ to approximately the same degree, no matter which precise species or amounts of components are selected (within the confines of the presently disclosed options for species and amounts). In other words, in the context of compositions and methods described herein, the components of inks described herein, other than the photoinitiator and non-curable absorber material, can essentially be (and generally are) optical "spectator" species at the wavelength λ, such that these "spectator" species do not substantially affect the $D_p$, $E_c$, and/or $D_{PT}$ values of the overall ink. Thus, as described in more detail below, the oligomeric and monomeric curable materials can, in some instances, be varied as desired from ink to ink (in terms of precise species and/or quantity) such that the precise species and/or quantity used from ink to ink have similar optical absorption profiles and/or refractive indices.

A "non-curable absorber material," for reference purposes herein, is a material or chemical species that is not curable or substantially curable by the curing radiation described herein and that absorbs at least a portion of the curing radiation, without causing substantial curing of other components of the ink. Thus, a "non-curable" absorber material can also be referred to as a "non-curing" or "non-reactive" absorber material. Moreover, a non-curable or non-curing absorber material described herein that is not "substantially" curable or that does not cause "substantial" curing is understood to convert (or use) less than 5%, less than 1%, less than 0.5%, or less than 0.1% of absorbed curing radiation photons into (or in) a curing event. For example, a non-curable (or non-curing) absorber material described herein, in some embodiments, can convert less than 2%, less than 1%, less than 0.5%, or less than 0.1% of absorbed photons into a free-radical species that can initiate or participate in (meth) acrylate polymerization or another curing process.

It is further to be understood that a non-curable or non-curing absorber material described herein can be a polymerization "spectator" (i.e., non-polymerizing or non-polymerization-initiating) species that nevertheless "competes" with a photoinitiator of the ink for absorption of photons of incident curing radiation. Thus, in some cases, a non-curable absorber material and a photoinitiator of an ink described herein have substantially overlapping photon absorption profiles, particularly in a region of the electromagnetic spectrum corresponding to or including the peak wavelength $\lambda$ described above. In some instances, for example, both the non-curable absorber material and the photoinitiator have an absorption peak within 30 nm, within 20 nm, within 15 nm, within 10 nm, or within 5 nm of the wavelength $\lambda$.

However, it is to be understood that a non-curable absorber material and a photoinitiator of an ink described herein need not have the same absorbance, optical density, extenuation coefficient, and/or molar extinction coefficient at the wavelength $\lambda$ or at any other specific wavelength. Instead, the non-curable absorber material and the photoinitiator can have differing absorbances, optical densities, extenuation coefficients, and/or molar extinction coefficients at the wavelength $\lambda$, as well as at other wavelengths.

In addition, in some cases, the amount of photoinitiator and the amount of non-curable absorber material included in an ink described herein are selected based on similarities or differences between the absorbances, optical densities, extenuation coefficients, and/or molar extinction coefficients of the species, including at the wavelength $\lambda$. For instance, in some cases, the amounts of the photoinitiator and the non-curable absorber material are selected to provide a desired ratio of total absorbance of each species at the wavelength $\lambda$, and/or to provide a desired $D_{PT}$, $D_p$, or $D_p/E_c$ value described hereinabove. In some such embodiments, the total absorbance of the non-curable absorber material at the wavelength $\lambda$ is about 0.1 to 10 times, about 0.2 to 5 times, or about 0.5 to 2 times the total absorbance of the photoinitiator at the wavelength $\lambda$, where the "total absorbance" of each species at the wavelength $\lambda$ is understood to refer to the amount (in moles) of the species times the molar extinction coefficient of the species at the wavelength $\lambda$.

It should further be noted that the wavelength $\lambda$ can be any wavelength not inconsistent with the objectives of the present disclosure. For example, in some cases, $\lambda$ is a wavelength in the ultraviolet (UV) or visible region of the electromagnetic spectrum. In some cases, the peak wavelength $\lambda$ is in the infrared (IR) region of the electromagnetic spectrum. In some embodiments, the wavelength $\lambda$ is between 250 nm and 400 nm or between 300 nm and 385 nm. In other cases, the wavelength $\lambda$ is between 600 nm and 800 nm or between 900 nm and 1.3 µm. However, the precise wavelength $\lambda$ is not particularly limited.

Any non-curable absorber material not inconsistent with the objectives of the present disclosure may be used in an ink described herein. For example, in some embodiments, a non-curable absorber material comprises a polycyclic aromatic compound such as pyrene. A non-curable absorber material may also be a "dye" that has an absorption profile consistent with the description above. Such a "dye" may, more particularly, be a hydrophobic or oil-soluble dye. For instance, in some cases, the non-curable absorber material is a yellow dye, such as an oil-soluble yellow dye. Other yellow dyes could also be used. In other instances, a non-curable absorber material comprises a blue or green dye, such as a KEYPLAST dye commercially available from Keystone, Inc. Additionally, in some embodiments, which may not be preferred, a non-curable absorber material may have a broader absorption profile rather than a narrower absorption profile. For example, in some such cases, the non-curable absorber material comprises a black dye. Carbon black or another carbon allotrope may also be used as a non-curable absorber material, in some embodiments.

As described above, the non-curable absorber material component can be present in an ink described herein in an amount up to 10 wt. %, based on the total weight of the ink. For example, in some instances, an ink comprises up to 7 wt. %, up to 5 wt. %, up to 3 wt. %, up to 2 wt. %, or up to 1 wt. % non-curable absorber material. In some embodiments, an ink comprises 0.01-10 wt. %, 0.01-5 wt. %, 0.01-3 wt. %, 0.01-2 wt. %, 0.01-1 wt. %, 0.05-10 wt. %, 0.05-5 wt. %, 0.05-3 wt. %, 0.05-1 wt. %, 0.1-10 wt. %, 0.1-7 wt. %, 0.1-5 wt. %, 0.1-3 wt. %, 0.1-1 wt. %, 0.5-10 wt. %, 0.5-7 wt. %, 0.5-5 wt. %, 0.5-2 wt. %, 0.5-1 wt. %, 1-10 wt. %, 1-7 wt. %, 1-5 wt. %, or 1-3 wt. % non-curable absorber material, based on the total weight of the ink. In some especially preferred embodiments, the amount of non-curable absorber material is no more than about 1 wt. %. For example, in some preferred embodiments, an ink described herein comprises 0.0001-1 wt. %, 0.0001-0.5 wt. %, 0.0001-0.1 wt. %, 0.001-1 wt. %, 0.001-0.5 wt. %, 0.001-0.1 wt. %, 0.001-0.05 wt. %, 0.01-1 wt. %, 0.01-0.5 wt. %, 0.01-0.1 wt. %, or 0.01-0.05 wt. % non-curable absorber material, based on the total weight of the ink. The use of a relatively small amount of non-curable absorber material, such as one of the immediately preceding amounts, can be especially advantageous for maintaining or achieving desired mechanical properties of an article formed from a given ink in a given instance, since the "inert" non-curable absorber material can play the role of a non-reactive "filler" as well as being an optically relevant material during curing.

Inks described herein also comprise one or more photoinitiators. Any photoinitiator not inconsistent with the objectives of the present disclosure may be used in an ink described herein. In some embodiments, for example, the photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyl-diphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a suitable photoinitiator comprises an α-hydroxyphenyl ketone, benzil dimethyl ketal or 2,4,6-trimethylbenzoyldiphenylphosphine oxide or a mixture thereof.

Another class of photoinitiators that may be included in an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541. A photoinitiator described herein may also be a cationic photoinitiator such as a triphenyl sulphonium photoinitiator.

A photoinitiator can be present in an ink described herein in any amount not inconsistent with the objectives of the present disclosure. In some embodiments, a photoinitiator is present in an ink in an amount of up to about 10 wt. %, up to about 8 wt. %, up to about 7 wt. %, up to about 5 wt. %, up to about 3 wt. %, or up to about 2 wt. %, based on the total weight of the ink. In some cases, a photoinitiator is present in an amount of about 0.1-10 wt. %, 0.1-5 wt. %, 0.1-3 wt. %, 0.1-2 wt. %, 0.5-5 wt. %, 0.5-3 wt. %, 0.5-2 wt. %, 1-10 wt. %, 1-8 wt. %, 1-5 wt. %, 1-4 wt. %, or 1-3 wt. %. In some especially preferred embodiments, an ink described herein comprises a photoinitiator in an amount of up to about 5 wt. %. For example, in some instances, the photoinitiator component is present in the ink in an amount of 0.1-5 wt. % or 0.5-5 wt. % or, even more preferably, 1-5 wt. %, 2-5 wt. %, or 2-4 wt. %, based on the total weight of the ink.

It is further to be understood that the amounts (weight percents) described in the immediately preceding paragraph refer to photoinitiators that are non-oligomeric and non-polymeric. That is, the amounts described above refer to "monomeric" or "molecular" photoinitiators, which may, for instance, have a molecular weight of less than 400. However, it is also to be understood that oligomeric or polymeric photoinitiators may be used in inks and methods described herein. But in such an instance (when an oligomeric or polymeric photoinitiator is used), then the amounts (weight percents) above are to be calculated without taking into account the weight of the oligomeric or polymeric portion or moiety of the oligomeric or polymeric photoinitiator. In other words, to determine the overall amount (weight percent) of the oligomeric or polymeric photoinitiator that is present in the ink, the calculation (specifically, the numerator) should be based on only the molecular weight of the photoactive moiety of the photoinitiator, not on the molecular weight(s) of the remaining moieties or repeating units of the oligomeric or polymeric photoinitiator (for purposes of the present disclosure).

Moreover, as described above, the amount of photoinitiator and the amount of non-curable absorber material can be selected with reference to each other. For example, in some cases, an ink described herein includes up to 5 wt. % photoinitiator and up to 1 wt. % non-curable absorber material. In other instances, an ink described herein comprises up to 4 wt. % photoinitiator and up to 0.5 wt. % non-curable absorber material, or up to 5 wt. % photoinitiator and up to 0.05 wt. % non-curable absorber material. In some especially preferred embodiments, an ink described herein comprises at least 1 wt. % photoinitiator, in combination with an amount of non-curable absorber material described herein, such as an amount of up to 0.5 wt. % non-curable absorber material. As described further herein, compositions including too little photoinitiator (especially compared to the amount of non-curable absorber material) can be insufficiently responsive to curing radiation within the distance $D_p$, with the result that insufficient polymerization takes place within the spatial region defined by $D_p$. In some cases, a preferred ratio (by weight) of photoinitiator to non-curable absorber material is 1 or more, 5 or more, or 10 or more. In some embodiments, a preferred ratio (by weight) of photoinitiator to non-curable absorber material is 1-200, 1-100, 5-100, 10-200, 10-150, 10-100, 25-200, 25-100, 50-200, 50-150, or 50-100 (where the weight of photoinitiator is the numerator, and the weight of non-curable absorber material is the denominator). Such ratios can, in some cases, provide a desired curing effect (e.g., achieving a desired $D_p$, $E_c$, or $D_p/E_c$ ratio) while minimizing the amount of otherwise non-functional or non-curing "filler" material, with respect to formation of a cured polymer network.

In addition, as described above, the relative amounts of photoinitiator and non-curable absorber material can be based, at least in part, on the total (optical) absorbance of each of the photoinitiator and the non-curable absorber material at the wavelength λ (as opposed to being based on only weight percent or mass). For example, if a non-curable absorber material absorbs relatively weakly at the wavelength λ, then a relatively large amount (molar or weight percent) of non-curable absorber material may be needed to achieve a desired "photon competition" with the photoinitiator, as compared to the situation when the non-curable absorber material absorbs relatively strongly at the wavelength λ (in which case a relatively small amount (molar or weight percent) of non-curable absorber material may be needed to achieve the same desired "photon competition"). Therefore, in some embodiments, a ratio of photoinitiator to non-curable absorber material described herein (such as a weight-based ratio described above) is used when the photoinitiator and the non-curable absorber material have absorption (or optical density) values at the wavelength λ that are within a factor of 2 of one another. Moreover, in some cases, a ratio described in the preceding paragraph (such as a ratio of photoinitiator to non-curable absorber material within the range of 10-100) is a total optical absorbance ratio at the wavelength λ, rather than a weight-based ratio.

Turning now to other specific components of inks described herein, inks described herein may comprise one or more oligomeric curable materials and/or one or more monomeric curable materials. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum. Additionally, the curing radiation generally includes the curing radiation having a peak wavelength of $\lambda$, as described above.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

"Oligomeric" species, which are contained in the oligomeric curable material described herein, are themselves polymers or oligomers and have a relatively high molecular weight or a relatively high viscosity. These species are also capable of undergoing additional polymerization, such as through one or more points of unsaturation described herein. A population of oligomeric species in the oligomeric curable material described herein can have varying molecular structures and/or formulas throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). The weight average molecular weight of an oligomeric curable material described herein can generally be in the range from about 400 to 10,000, from about 600 to 10,000, from about 500 to 7,000, or from about 500 to 5,000.

In contrast to an "oligomeric" species, "monomeric" species, which are contained in the monomeric curable material described herein, are not themselves a polymer or oligomer, and have a relatively low molecular weight or a relatively low viscosity. "Monomeric" species contained in the monomeric curable material can have a consistent or well-defined molecular structure and/or formula throughout the population (such as may be exhibited, for instance, by a specified mass of ethoxylated (4) bisphenol A diacrylate or a specific mass of the above-described curable monomer). Additionally, in some embodiments, a monomeric curable material as described herein has a viscosity of 500 centipoise (cP) or less at 25° C., when measured according to ASTM D2983, while an "oligomeric" curable material has a viscosity of 1000 cP or more at 25° C., when measured according to ASTM D2983.

One non-limiting example of a polymerizable moiety of the oligomeric curable material or the monomeric curable material described herein is an ethylenically unsaturated moiety, such as a vinyl moiety, allyl moiety, or (meth) acrylate moiety, where the term "(meth)acrylate" includes acrylate or methacrylate or a mixture or combination thereof.

Additionally, the oligomeric curable material and the monomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material of an ink described herein comprises a mono(meth)acrylate, a difunctional curable material of an ink described herein comprises a di(meth)acrylate, a trifunctional curable material of an ink described herein comprises a tri(meth)acrylate, a tetrafunctional curable material of an ink described herein comprises a tetra(meth)acrylate, and a pentafunctional curable material of an ink described herein comprises a penta (meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species, i.e., a monomeric species, or a relatively high molecular weight species, i.e., an oligomeric species.

In general, any oligomeric curable material or combination of oligomeric curable materials not inconsistent with the objectives of the present disclosure may be used in an ink described herein. For example, in some cases, oligomeric curable materials suitable for use in inks described herein have similar wavelength absorption profiles and/or refractive indices, including absorption profiles and/or refractive indices described hereinabove with reference to the wavelength $\lambda$ or wavelengths near (e.g., within 30 nm of) the wavelength $\lambda$. In some instances, an oligomeric curable material described herein has a photon absorption profile that is outside of, or does not include, curing radiation having the peak wavelength $\lambda$.

In some cases, an oligomeric curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono(meth)acrylate or polyethylene glycol mono (meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate. An oligomeric material may also comprise a cycloaliphatic epoxy.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; an aliphatic urethane diacrylate, commercially available from ALLNEX under the trade name EBECRYL 8402; a multifunctional acrylate oligomer, commercially available from DYMAX Corporation under the trade name BR-952; and aliphatic polyether urethane acrylate, commercially available from DYMAX Corporation under the trade name BR-371 S. Other commercially available oligomeric curable materials may also be used.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

The oligomeric curable material can be present in an ink described herein in any amount not inconsistent with the objectives of the present disclosure. In some cases, the oligomeric curable material, in total, is present in the ink in an amount up to about 80 wt. %, up to 70 wt. %, up to about 60 wt. %, up to about 50 wt. %, up to about 40 wt. %, up to about 30 wt. %, or up to about 20 wt. %, based on the total weight of the ink. In some instances, an ink described herein comprises about 10-80 wt. % or 10-70 wt. % oligomeric curable material, based on the total weight of the ink. In some embodiments, an ink comprises about 10-60 wt. %, 10-50 wt. %, 10-40 wt. %, 10-30 wt. %, 10-20 wt. %, 15-40 wt. %, 15-30 wt. %, 20-60 wt. %, 20-50 wt. %, 20-40 wt. %, 30-60 wt. %, 30-50 wt. %, or 40-60 wt. % oligomeric curable material, based on the total weight of the ink. In some especially preferred embodiments, the amount of oligomeric curable material is no greater than about 60 wt. %, based on the total weight of the ink. In some cases, for example, an ink described herein comprises 10-60 wt. %, 10-55 wt. %, 15-60 wt. %, 15-55 wt. %, 15-50 wt. %, 20-60 wt. %, 20-55 wt. %, 20-50 wt. %, 25-60 wt. %, 25-55 wt. %, 25-50 wt. %, 30-60 wt. %, 30-55 wt. %, 30-50 wt. %, 35-60 wt. %, 35-55 wt. %, 40-60 wt. %, 40-55 wt. %, 40-50 wt. %, 45-60 wt. %, 45-55 wt. %, or 50-60 wt. % oligomeric curable material, based on the total weight of the ink.

Moreover, when the amount of oligomeric curable material in an ink described herein is greater than 60 wt. %, it is be understood that relatively low molecular weight oligomers are generally used and generally preferred. For example, if an ink described herein comprises 65-80 wt. % oligomeric curable material, then the average molecular weight (e.g., the weight average molecular weight) of the oligomeric curable material may be less than 1000, as opposed to being greater than 1000. Alternatively, in other instances when the amount of oligomeric curable material in an ink described herein is greater than 60 wt. %, an oligomeric curable material having a weight average molecular weight above 1000 can be used, provided that the ink is used at an elevated temperature during the additive manufacturing process, such that the viscosity of the ink is similar to the viscosity of other inks described above in this paragraph.

In addition, any monomeric curable material or combination of monomeric curable materials not inconsistent with the objectives of the present disclosure may be used as the monomeric curable material component. For example, in some cases, monomeric curable materials suitable for use in inks described herein have similar wavelength absorption profiles and/or refractive indices, including absorption profiles and/or refractive indices described hereinabove with reference to the wavelength $\lambda$ or wavelengths near (e.g., within 30 nm of) the wavelength $\lambda$. In some instances, a monomeric curable material described herein has a photon absorption profile that is outside of, or does not include, curing radiation having the peak wavelength $\lambda$.

In some cases, the monomeric curable material of an ink described herein comprises one or more species of (meth) acrylates, such as one or more monofunctional, difunctional, trifunctional, tetrafunctional (meth)acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth) acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth) acrylate, tetrahydrofurfuryl methacrylate, isobornyl (meth) acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth)acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate. In some cases, a monomeric curable material comprises a cycloaliphatic epoxy.

Additional non-limiting examples of commercially available monomeric curable materials useful in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; a cyclic monofunctional acrylate, commercially available by RAHN USA Corp. under the trade name GENOMER 1120; and dipentaerythritol pentaacrylate, commercially available from SARTOMER under the trade name SR 399 LV. Other commercially available monomeric curable materials may also be used.

The monomeric curable material can be present in an ink described herein in any amount not inconsistent with the objectives of the present disclosure. In some cases, the monomeric curable material, in total, is present in an amount up to about 80 wt. %, up to about 70 wt. %, up to about 60 wt. %, or up to about 50 wt. %, based on the total weight of the ink. In some cases, an ink described herein comprises about 0-80 wt. % or 10-80 wt. % monomeric curable material, based on the total weight of the ink. In some embodiments, an ink comprises about 0-75 wt. %, 0-70 wt. %, 0-60 wt. %, 0-50 wt. %, 0-40 wt. %, 0-35 wt. %, 0-30 wt. %, 0-25 wt. %, 0-20 wt. %, 0-15 wt. %, 0-10 wt. %, 0-5 wt. %, 10-75 wt. %, 10-70 wt. %, 10-60 wt. %, 10-50 wt. %, 10-40 wt. %, 10-35 wt. %, 10-30 wt. %, 10-25 wt. %, 10-20 wt. %, 20-80 wt. %, 20-60 wt. %, or 20-40 wt. % monomeric curable material, based on the total weight of the ink.

Turning to possible additional components of inks described herein, inks described herein can further comprise one or more photosensitizers. In general, such a sensitizer can be added to an ink to increase the effectiveness of one or more photoinitiators that may also be present. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the ink. However, in other cases, an ink described herein excludes a sensitizer such as described above.

Turning to another possible component of the ink described herein, inks described herein can also comprise at least one colorant, which may be different from the non-curable absorber material of the ink. Such a colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. Moreover, in some cases, a particulate colorant described herein has an average particle size of less than about 5 μm, or less than about 1 μm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink.

Moreover, inks described herein, in some embodiments, further comprise one or more polymerization inhibitors and/or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

In some embodiments, an ink described herein may contain viscosity modifying agents. Non-limiting examples of viscosity modifying agents include a saturated fatty acid or a combination of saturated fatty acids, or an oil, such as a plant oil. The inks described herein may comprise up to 5 wt. % up to 3 wt. %, up to 1 wt. %, up to 0.5 wt. %, or up to 0.1 wt. % of a viscosity modifying agent not inconsistent with the objectives of the present disclosure.

Inks described herein can exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C. or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in some 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state. Solidification of an ink can also occur due to curing of the ink.

Additionally, in some embodiments, the inks described herein, when non-cured, have a viscosity profile consistent with the requirements and parameters of one or more 3D printing systems, such as an MJP or SLA system. For example, in some cases, an ink described herein has a dynamic viscosity at 30° C. of 1600 centipoise (cP) or less, 1200 cP or less, or 800 cP or less. In a preferred embodiment, an ink described herein has a dynamic viscosity of 500 cP or less at 30° C., when measured according to ASTM standard D2983 (e.g., using a Brookfield Model DV-II+ Viscometer). In some cases, an ink described herein when non-cured exhibits a dynamic viscosity of about 200-1600 cP, about 200-1200 cP, about 200-800 cP, about 200-500 cP, or about 200-400 cP at 30° C., when measured according to ASTM D2983.

Inks described herein can also exhibit a variety of desirable properties, in addition to those described hereinabove, in a cured state. An ink in a "cured" state, as used herein, comprises an ink that includes a curable material or polymerizable component that has been at least partially cured, i.e., at least partially polymerized and/or cross-linked. For instance, in some cases, a cured ink is at least about 70% polymerized or cross-linked or at least about 80% polymerized or cross-linked. In some embodiments, a cured ink is at least about 85%, at least about 90%, at least about 95%, at least about 98%, or at least 99% polymerized or cross-linked. In some instances, a cured ink is between about 80% and about 99% polymerized or cross-linked.

In some cases, an ink described herein, when cured, has an elongation at break of about 10 to 70%, about 10 to 60%, about 15 to 50%, or about 20 to 50%, when measured according to ASTM D638. Further, a cured ink described herein, in some cases, can have a tensile strength of about 40 to 70 MPa about 40 to 60 MPa, or about 45 to 55 MPa when measured according to ASTM D638. Additionally, a cured ink described herein, in some embodiments, can have a tensile modulus of about 1800 to 2100 MPa, about 1900 to 2100 MPa, or about 1950 to 2050 MPa when measured according to ASTM D638. Also, a cured ink described herein can have an impact resistance of 1 to 4 ft·lb/in (Notched), 1 to 3 ft·lb/in (Notched), or 1 to 2 ft·lb/in (Notched) when measured according to ASTM D256. Finally, in some cases, a cured ink described herein has a flexual modulus of 2000 to 2500 MPa, 2100 to 2400 MPa, or 2100 to 2200 MPa when measured according to ASTM D790.

Moreover, in some cases, an ink described herein, when cured, can exhibit a plurality of the foregoing properties. For example, in some embodiments, an ink when cured has a tensile strength of about 40-70 MPa when measured according to ASTM D638; an impact resistance of 1 to 4 ft·lb/in (Notched), when measured according to ASTM D256; and an elongation at break of about 10-70% when measured according to ASTM D638.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system.

Inks described herein can also include, have, or exhibit any combination of components and/or properties described hereinabove individually, provided that the combination of components and/or properties is not inconsistent with the principles and objectives of the present invention. For example, in some preferred embodiments, an ink described herein comprises up to 60 wt. % oligomeric curable material; up to 80 wt. % monomeric curable material; up to 5 wt. % photoinitiator; up to 1 wt. % non-curable absorber material; and up to 10 wt. % one or more additional components, based on the total weight of the ink, wherein the total amount of the oligomeric curable material, monomeric curable material, photoinitiator, non-curable absorber material, and one or more additional components is equal to 100 wt. %; wherein the photoinitiator is operable to initiate curing of the oligomeric curable material and/or the monomeric curable material when the photoinitiator is exposed to incident curing radiation having a Gaussian distribution of wavelengths and a peak wavelength λ; wherein the ink has a penetration depth ($D_p$) and a critical energy ($E_c$) at the wavelength λ; and wherein the ink has a print through depth ($D_{PT}$) at the wavelength λ of less than or equal to $2 \times D_p$, or a $D_p/E_c$ value of 10-50 (μm cm²)/mJ. In other preferred embodiments, an ink described herein comprises 40-60 wt. % oligomeric curable material, 40-60 wt. % monomeric curable material, 1-5 wt. % photoinitiator, and 0.001-0.1 wt. % non-curable absorber material, based on the total weight of the ink, wherein the total amount of the oligomeric curable material, monomeric curable material, photoinitiator, non-curable absorber material, and one or more additional components is equal to 100 wt. %; wherein the photoinitiator is operable to initiate curing of the oligomeric curable material and/or the monomeric curable material when the photoinitiator is exposed to incident curing radiation having a Gaussian distribution of wavelengths and a peak wavelength λ; wherein the ink has a penetration depth ($D_p$) and a critical energy ($E_c$) at the wavelength λ; wherein the ink has a print through depth ($D_{PT}$) at the wavelength λ of less than or equal to $1.5 \times D_p$; and wherein $E_c$ is less than 15 mJ/cm². Moreover, in still other preferred embodiments, an ink described in this paragraph further has one, at least two, or, in especially preferred embodiments, all of the following characteristics: (1) a ratio of $D_p$ to $E_c$, in units of (μm cm²)/mJ, of between 10 and 50; (2) a ratio of photoinitiator to non-curable absorber material, by weight, of between 5 and 100; and (3) a $D_p$ of no greater than 200 μm or no greater than 100 μm. Inks having such characteristics can be especially preferred for providing improved accuracy and/or precision of additive manufacturing while also maintaining a normal (or faster) speed of the additive manufacturing process, while also maintaining (or improving) normal energy efficiency of the additive manufacturing process (in terms of energy required for curing), and/or while also maintaining (or improving) desired mechanical properties of the printed articles. It is to be understood that "normal" or "maintained" characteristics as described above are relative to inks that are comparable to inventive inks according to the present disclosure/preferred embodiments, but that do not fall within the inventive metrics identified above. Similarly, it is further to be understood that "desired mechanical properties" can vary based on a given selection of ink components. Again, however, inks such as the preferred inks described above can provide the advantages contemplated in this disclosure without substantial loss of mechanical properties the inks would otherwise provide if they (the inks) fell outside of the inventive parameters described herein. For example, an ink that is formulated to have high elongation or tensile strength (e.g., through selection of specific monomeric and/or oligomeric curable materials) can maintain such elongation or tensile strength despite the inclusion of a photoinitiator and non-curable absorbable material in the formulation in a manner consistent with the preferred embodiments above (e.g., an elongation or tensile strength can be achieved with preferred inks described herein, wherein the elongation or tensile strength deviates by no greater than 5% from the desired elongation or tensile strength value, using the desired value as the denominator for calculating the percent deviation).

II. Methods of Forming a 3D Article

In another aspect, methods of forming or "printing" a 3D article or object by additive manufacturing are described herein. Methods of forming a 3D article or object described herein can include forming the 3D article from a plurality of layers of an ink described herein in a layer-by-layer manner. Methods of forming a 3D article by additive manufacturing can also include forming the object in a manner other than a layer-by-layer manner. Any ink described hereinabove in Section I may be used in a method described herein.

For example, in some cases, a method described herein comprises providing an ink having a penetration depth ($D_p$) and a critical energy ($E_c$) at a wavelength λ; and selectively curing a portion of the ink using incident curing radiation having a Gaussian distribution of wavelengths and a peak wavelength at the wavelength λ, wherein the ink has a print through depth ($D_{PT}$) at the wavelength λ of less than or equal to $2 \times D_p$, and/or a ratio of $D_p$ to $E_c$, in units of (μm cm²)/mJ, of 10-50. Moreover, in some embodiments described herein, the ink is selectively cured according to preselected computer aided design (CAD) parameters, and the $D_p$ corresponds to a voxel depth of the CAD parameters. Moreover, in some cases, one or more layers of an ink described herein has a thickness of about 10 μm to about 100 μm, about 10 μm to about 80 μm, about 10 μm to about 50 μm, about 20 μm to about 100 μm, about 20 μm to about 80 μm, or about 20 μm to about 40 μm. Other thicknesses are also possible.

Additionally, it is to be understood that methods of printing a 3D article described herein can include, for example, MJP or SLA 3D printing methods. For example, in some instances, a MJP method of printing a 3D article comprises selectively depositing layers of an ink described herein in a fluid state onto a substrate, such as a build pad of a 3D printing system. In addition, in some embodiments, a method described herein further comprises supporting at least one of the layers of the ink with a support material. Any support material not inconsistent with the objectives of the present disclosure may be used.

A method described herein can also comprise curing the layers of the ink, including with curing radiation described above (such as curing radiation having a peak wavelength λ). Moreover, curing can comprise polymerizing one or more polymerizable moieties or functional groups of one or more components of the ink. In some cases, a layer of deposited ink is cured prior to the deposition of another or adjacent layer of ink. Additionally, curing one or more layers of deposited ink, in some embodiments, is carried out by exposing the one or more layers to electromagnetic radiation, such as UV light, visible light, or infrared light, as described above.

Further details regarding various methods, including "material deposition" methods (such as MJP) or "vat polymerization" methods (such as SLA), are provided below.

A. Material Deposition Methods

In a material deposition method, one or more layers of an ink described herein are selectively deposited onto a substrate and cured. Curing of the ink may occur after selective deposition of one layer, each layer, several layers, or all layers of the ink.

In some instances, an ink described herein is selectively deposited in a fluid state onto a substrate, such as a build pad of a 3D printing system. Selective deposition may include, for example, depositing the ink according to preselected CAD parameters. For example, in some embodiments, a CAD file drawing corresponding to a desired 3D article to be printed is generated and sliced into a sufficient number of horizontal slices. Then, the ink is selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of ink described herein is heated to the appropriate temperature and jetted through a print head or a plurality of print heads of a suitable inkjet printer to form a layer on a print pad in a print chamber. In some cases, each layer of ink is deposited according to preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV, visible, or infrared light) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization, curing, or planarization and curing. Any support material not inconsistent with the objectives of the present disclosure may be used.

Layered deposition of the ink and support material can be repeated until the 3D article has been formed. In some embodiments, a method of printing a 3D article further comprises removing the support material from the ink.

Curing of the ink may occur after selective deposition of one layer of ink, of each layer of ink, of several layers of ink, or of all layers of the ink necessary to print the desired 3D article. In some embodiments, a partial curing of the deposited ink is performed after selective deposition of one layer of ink, each layer of ink, several layers of ink, or all layers of the ink necessary to print the desired 3D article. A "partially cured" ink, for reference purposes herein, is one that can undergo further curing. For example, a partially cured ink is up to about 30% polymerized or cross-linked or up to about 50% polymerized or cross-linked. In some embodiments, a partially cured ink is up to about 60%, up to about 70%, up to about 80%, up to about 90%, or up to about 95% polymerized or cross-linked.

Partial curing of the deposited ink can include irradiating the ink with an electromagnetic radiation source or photocuring the ink (including with curing radiation described hereinabove). Any electromagnetic radiation source not inconsistent with the objectives of the present disclosure may be used, e.g., an electromagnetic radiation source that emits UV, visible or infrared light. For example, in some embodiments, the electromagnetic radiation source can be one that emits light having a wavelength from about 300 nm to about 900 nm, e.g., a Xe arc lamp.

Further, in some embodiments, a post-curing is performed after partially curing is performed. For example, in some cases, post-curing is carried out after selectively depositing all layers of the ink necessary to form a desired 3D article, after partially curing all layers of the ink, or after both of the foregoing steps have been performed. Moreover, in some embodiments, post-curing comprises photocuring, including with curing radiation described hereinabove having a peak wavelength $\lambda$. Again, any electromagnetic radiation source not inconsistent with the objectives of the present disclosure may be used for a post-curing step described herein. For example, in some embodiments, the electromagnetic radiation source can be a light source that has a higher energy, a lower energy, or the same energy as the electromagnetic radiation source used for partial curing. In some cases wherein the electromagnetic radiation source used for post-curing has a higher energy (i.e., a shorter wavelength) than that used for partial curing, a Xe arc lamp can be used for partial curing and a Hg lamp can be used for post-curing.

Additionally, after post-curing, in some cases, the deposited layers of ink are at least about 80% polymerized or cross-linked or at least about 85% polymerized or cross-linked. In some embodiments, the deposited layers of ink are at least about 90%, at least about 95%, at least about 98%, or at least about 99% polymerized or cross-linked. In some instances, the deposited layers of ink are about 80-100%, about 80-99%, about 80-95%, about 85-100%, about 85-99%, about 85-95%, about 90-100%, or about 90-99% polymerized or cross-linked.

B. Vat Polymerization Methods

It is also possible to form a 3D article from an ink described herein using a vat polymerization method, such as an SLA method. Thus, in some cases, a method of printing a 3D article described herein comprises retaining an ink described herein in a fluid state in a container and selectively applying energy (particularly, for instance, the curing radiation having the peak wavelength $\lambda$) to the ink in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy (e.g., the curing radiation) to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, in some instances, the electromagnetic radiation has an average wavelength of 300-900 nm, and in other embodiments the electromagnetic radiation has an average wavelength that is less than 300 nm. In some cases, the curing radiation is provided by a computer controlled laser beam. In addition, in some cases, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy (e.g., curing radiation of peak wavelength λ) to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy (e.g., curing radiation described herein) to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution. The "feature resolution" of an article, for reference purposes herein, can be the smallest controllable physical feature size of the article. The feature resolution of an article can be described in terms of a unit of distance such as microns (µm), or in terms of dots per inch (dpi). As understood by one of ordinary skill in the art, a higher feature resolution corresponds to a higher dpi value but a lower distance value in µm. In some cases, an article formed by depositing or solidifying an ink described herein can have a feature resolution of about 500 µm or less, about 200 µm or less, about 100 µm or less, or about 50 µm or less, including at elevated temperatures. In some embodiments, an article has a feature resolution between about 50 µm and about 500 µm, between about 50 µm and about 200 µm, between about 50 µm and about 100 µm, or between about 100 µm and about 200 µm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

In a vat polymerization method such as described above, the ink may be partially cured as described in Section IIA above. For example, in some embodiments, selectively applying energy to the ink in the container to solidify at least a portion of a fluid layer of the ink may include partially curing at least a portion of a fluid layer of the ink. In other embodiments, partial curing of at least a portion of a fluid layer of the ink may occur after a first layer of the ink is provided and solidified, before or after a second layer of the ink is provided or solidified, or before or after one, several, or all subsequent layers of the ink are provided or solidified.

Additionally, in some embodiments of a vat polymerization method described herein, after partial curing or after the desired 3D article is formed, post-curing as described in Section IIA above may be performed. The desired 3D article may be, for example, an article that corresponds to the design in a CAD file.

III. Printed 3D Articles

In another aspect, printed 3D articles are described herein. In some embodiments, a printed 3D article is formed from an ink described herein. Any ink described hereinabove in Section I may be used. For example, in some cases, the ink comprises up to 60 wt. % oligomeric curable material; up to 80 wt. % monomeric curable material; up to 5 wt. % photoinitiator; up to 1 wt. % non-curable absorber material; and up to 10 wt. % one or more additional components, based on the total weight of the ink, wherein the total amount of the foregoing components is equal to 100 wt. %. Additionally, the photoinitiator is operable to initiate curing of the oligomeric curable material and/or the monomeric curable material when the photoinitiator is exposed to incident curing radiation having a peak wavelength λ. Moreover, the ink has a penetration depth ($D_p$), a critical energy ($E_c$), and a print through depth ($D_{PT}$) at the wavelength λ of less than or equal to $2 \times D_p$.

Some embodiments of inks for 3D printing are also further illustrated in the following non-limiting Examples.

EXAMPLE 1

Method of Preparing Inks

Inks according to some embodiments described herein were prepared as follows. Specifically, to prepare various inks, the components in the following Tables I-VI were mixed in a reaction vessel to form specific inks, as identified in the Tables. The amounts of various components in Tables I-VI refer to the wt. % of each component of the identified ink, based on the total weight of the ink. For each ink, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature.

EXAMPLE 2

Different Oligomeric and Monomeric Curable Material Amounts

Inks 1 and 2 in Table I were prepared according to the procedure in Example 1. The amounts of the oligomeric curable material and the monomeric curable material were varied while the amounts of photoinitiator and non-curable absorber material remained constant. The oligomeric curable materials and the monomeric curable materials in Inks 1 and 2 were the same, in terms of chemical identity, consisting of (meth)acrylates that are non-absorbing at the wavelength λ (which was 405 nm). The photoinitiator was the same in each of Inks 1 and 2, consisting of Irgacure 819. The non-curable absorber material was the same in each of Inks 1 and 2, consisting of a 1:1 mixture by weight of Oil Yellow and Blue B from Keystone. The amounts of the various components of Inks 1 and 2 in Table I are provided as weight percentages (wt. %), based on the total weight of each ink. Values of $D_p$ and $E_c$ are also provided in Table I for each ink. The units for these values in Table I (and subsequent tables) are as follows: $D_p$ (μm), $E_c$ (mJ/cm$^2$), and $D_P/E_C$ Ratio ((μm cm$^2$)/mJ).

TABLE I

Ink Compositions.

|  | Ink 1 | Ink 2 |
|---|---|---|
| Oligomeric Curable Material | 28 | 37 |
| Monomeric Curable Material | 68.94 | 59.94 |
| Photoinitiator | 3 | 3 |
| Non-Curable Absorber Material | 0.06 | 0.06 |
| $D_p$ | 77.4 | 78.0 |
| $E_c$ | 3.33 | 3.48 |
| $D_P/E_C$ Ratio | 23.2 | 22.4 |

As shown in Table I, $D_p$, $E_c$, and the ratio $D_p/E_c$ (and thus also $D_{PT}$) remain substantially constant across different concentrations of the oligomeric and monomeric curable materials, indicating that the amounts of photoinitiator and non-curable absorber material exert primary control over $D_p$, $E_c$, and $D_{PT}$ for these compositions (as well as for other compositions in which the curable materials are optical spectators, as described further hereinabove and in Example 3 below).

EXAMPLE 3

Different Oligomeric and Monomeric Curable Materials

Inks 3-6 in Table II were prepared according to the procedure in Example 1 (again, the components are provided in Table II as weight percentages). In Inks 3 and 4, the concentrations of the oligomeric and monomeric curable materials, photoinitiator, and non-curable absorber material remained substantially constant, and the oligomeric curable material, photoinitiator, and non-curable absorber materials were the same. However, the type or species of monomeric curable material was different for each of Inks 3 and 4. Specifically, the Inks included different species of (meth) acrylate monomers. But the monomeric curable materials for both Inks 3 and 4 were substantially non-absorbing, optical spectator species at the wavelength λ (405 nm).

In Inks 5 and 6, the concentrations of the oligomeric and monomeric curable materials, photoinitiator, and non-curable absorber material remained substantially constant. Additionally, the photoinitiator and non-curable absorber materials were the same species in both Inks. However, the type or species of oligomeric curable material was different for each of Inks 5 and 6. Specifically, the Inks included different species of aliphatic urethane acrylates (Ink 6 included triacrylate, while Ink 5 included only diacrylate). The oligomeric curable materials for both Inks 5 and 6 were substantially non-absorbing, optical spectator species at the wavelength λ (405 nm).

TABLE II

Ink Compositions.

|  | Ink 3 | Ink 4 | Ink 5 | Ink 6 |
|---|---|---|---|---|
| Oligomeric Curable Material | 36.7 | 37 | 35 | 34.65 |
| Monomeric Curable Material | 60 | 59.7 | 62.25 | 62.6 |
| Photoinitiator | 3.25 | 3.25 | 2.7 | 2.7 |
| Non-Curable Absorber Material | 0.05 | 0.05 | 0.05 | 0.05 |
| $D_p$ | 71.1 | 69.4 | 88.1 | 85.6 |
| $E_c$ | 2.5 | 2.4 | 4.76 | 4.48 |
| $D_P/E_C$ Ratio | 28.4 | 28.9 | 18.5 | 19.1 |

As shown in Table II for Inks 3 and 4, changes in the type of monomeric curable material result in minor changes in $D_p$, $E_c$, and the ratio $D_p/E_c$ (and thus also $D_{PT}$), since the monomeric curable materials are essentially optical spectator species. Similarly for Inks 5 and 6, changes in the type of oligomeric curable material also result in only minor changes in $D_p$, $E_c$, and the ratio $D_p/E_c$.

EXAMPLE 4

Additional Variations

Inks 7-14 in Table III were prepared according to the procedure in Example 1 (again, the components are provided in Table III as weight percentages). Table IV identifies the various components used in the various Inks in Tables III. In Tables III and IV, dashes (--) indicate that the component was absent or the value is not reported here. However, to be clear, all of Inks 7-14 are "according to the present invention" as broadly described herein (the same is also true for all of Inks 1-6). Additionally, Inks 1-12 are particularly preferred embodiments of the present invention. All components of Inks 7-12 in Table III below, other than the photoinitiator and non-curable absorber material, were substantially non-absorbing at the wavelength λ, such that these species were essentially optical spectators, as described hereinabove.

TABLE III

Ink Compositions.

|  | Ink 7 | Ink 8 | Ink 9 | Ink 10 | Ink 11 | Ink 12 | Ink 13 | Ink 14 |
|---|---|---|---|---|---|---|---|---|
| Oligomeric Curable Material | 55 | 35 | 28 | 26.5 | 23.85 | 23.85 | 18 | 18 |
| Monomeric Curable Material | 38 | 63 | 69 | 70 | 72 | 73.2 | 66 | 66 |

TABLE III-continued

Ink Compositions.

| | Ink 7 | Ink 8 | Ink 9 | Ink 10 | Ink 11 | Ink 12 | Ink 13 | Ink 14 |
|---|---|---|---|---|---|---|---|---|
| Photoinitiator | 5 | 1.97 | 3 | 3.44 | 4.1 | 2.9 | 4 | 4 |
| Non-Curable Absorber Material | 2 | 0.03 | 0.03 | 0.06 | 0.05 | 0.05 | 2 | 2 |
| Additional Component | — | — | — | — | — | — | 10 | 10 |
| $D_p$ | — | — | 84.2 | 77.9 | 96.5 | 136 | 17.8 | 53.3 |
| $E_c$ | — | — | 6.95 | 3.25 | 4.99 | 7.12 | 40.0 | 54.0 |
| $D_p/E_c$ Ratio | — | — | 12.1 | 24.0 | 19.3 | 19.1 | 0.445 | 0.988 |

As illustrated in Table III, different concentrations and types of photoinitiators and non-curable absorber materials can be used in inks described herein to adjust $D_p$, $E_c$, and the ratio $D_p/E_c$ (and thus also $D_{PT}$).

EXAMPLE 5

Comparative Data

Inks 15-17 and Comparative Inks 1 and 2 were prepared according to the procedure in Example 1. As shown in Table IV, Inks 15 and 16 are compared with Comparative ("Comp.") Ink 1. Inks 15 and 16 have the same oligomeric and monomeric curable material types at comparable amounts as Comparative Ink 1. All three inks also include the same photoinitiator and non-curable absorber material. However, the ratio of photoinitiator to non-curable absorber material in Comparative Ink 1 is too low to achieve a $D_p/E_c$ ratio consistent with desired results described herein (such as printing efficiency and speed), particularly due to the high $E_c$. Ink 17 and Comparative Ink 2, which are compared to one another, include the same oligomeric and monomeric curable material types in comparable amounts. Both inks also include the same photoinitiator and non-curable absorber material. However, the amount of non-curable absorber material in Comparative Ink 2 is too high. For additional comparison purposes, it should be further noted that Inks 1-12 exhibited improved print through properties while also maintaining desired mechanical properties, as compared to inks otherwise similar but omitting the combinations of photoinitiator and non-curable absorber material of Inks 1-12 (data not shown).

TABLE IV

Ink Components.

| | Ink 7 | Ink 8 | Ink 9 | Ink 10 | Ink 11 | Ink 12 | Ink 13 | Ink 14 |
|---|---|---|---|---|---|---|---|---|
| Oligomeric Curable Material | glycidyl | urethane acrylate | urethane acrylate | urethane acrylate | urethane acrylate | urethane acrylate | glycidyl | glycidyl |
| Monomeric Curable Material | oxetane/acrylate (50/50) | acrylate | acrylate | acrylate | acrylate | acrylate | oxetane/acrylate (50/50) | oxetane/acrylate (50/50) |
| Photoinitiator | triphenyl sulfonium | Irgacure TPO | Irgacure 819 | Irgacure 819/Irgacure 184 (7/1) | Irgacure 819/Irgacure 184/UVI 6976 (7/1/3) | Irgacure 819/Irgacure 184/UVI 6976 (4/1/3) | triphenyl sulfonium | triphenyl sulfonium |
| Non-Curable Absorber Material | pyrene | Keystone Oil Yellow | Keystone Oil Yellow/Keystone Blue B (50/50) | Keystone Oil Yellow/Keystone Blue B (50/50) | Keystone Oil Yellow/Keystone Blue B (50/50) | Keystone Oil Yellow/Keystone Blue B (50/50) | exfoliated graphene | fullerene |
| Additional Component | — | — | — | — | — | — | polyol | polyol |

TABLE IV

Comparative Ink Compositions

| | Ink 15 | Ink 16 | Comp. Ink 1 | Ink 17 | Comp. Ink 2 |
|---|---|---|---|---|---|
| Oligomeric Curable Material | 57.95 | 54 | 56.99 | 51.9 | 49 |
| Monomeric Curable Material | 40 | 40 | 42 | 38 | 36 |
| Photoinitiator | 2 | 5 | 0.01 | 10 | 10 |
| Non-Curable Absorber Material | 0.05 | 1 | 1 | 0.1 | 5 |
| $D_p$ | 70 | 70 | 10 | 25 | 5 |
| $E_c$ | 4 | 5.6 | 100 | 2 | 100 |
| $D_p/E_c$ Ratio | 18 | 13 | 0.1 | 13 | 0.05 |

As demonstrated by the data in the Examples above, it is to be understood that inks described and claimed herein are not limited to only the exact embodiments of Inks 1-17. Instead, based on the teachings of the present disclosure, other specific inks can be formulated by those of ordinary skill in the art.

EXAMPLE 6

Additional Exemplary Ink Compositions

In addition to Inks 1-17 above, other inks according to the present disclosure are provided using the amounts in Table V below. The amounts in Table V refer to the wt. % of each component of the identified ink, based on the total weight of the ink, and the total amount equals 100 wt. % in a given instance. Additionally, "PI" stands for "photoinitiator."

TABLE V

Ink Components.

| Oligomeric Curable Material | Monomeric Curable Material | PI | Non-Curable Absorber Material |
|---|---|---|---|
| 10-80 | 0-40 | 1-10 | 0.01-2 |
| 10-70 | 10-40 | 2-10 | 0.01-1 |
| 20-70 | 0-60 | 3-5 | 0.01-1 |
| 20-60 | 20-60 | 1-5 | 0.01-1 |
| 20-50 | 20-50 | 2-5 | 0.01-0.1 |
| 20-50 | 20-70 | 1-4 | 0.01-0.05 |
| 20-40 | 50-70 | 1-4 | 0.01-0.5 |
| 20-50 | 20-60 | 2-4 | 0.01-1 |
| 30-40 | 10-70 | 2-5 | 0.01-1 |
| 20-40 | 10-80 | 1-5 | 0.01-1 |

Some additional, non-limiting example embodiments are provided below.

Embodiment 1. An ink for use in a three-dimensional printing system, the ink comprising:
 up to 80 wt. % oligomeric curable material;
 up to 80 wt. % monomeric curable material;
 up to 10 wt. % photoinitiator;
 up to 1 wt. % non-curable absorber material; and
 up to 10 wt. % one or more additional components, based on the total weight of the ink,
 wherein the total amount of the oligomeric curable material, monomeric curable material, photoinitiator, non-curable absorber material, and one or more additional components is equal to 100 wt. %;
 wherein the photoinitiator is operable to initiate curing of the oligomeric curable material and/or the monomeric curable material when the photoinitiator is exposed to incident curing radiation having a Gaussian distribution of wavelengths and a peak wavelength $\lambda$;
 wherein the ink has a penetration depth ($D_p$) and a critical energy ($E_c$) at the wavelength $\lambda$; and
 wherein the ink has a print through depth ($D_{PT}$) at the wavelength $\lambda$ of less than or equal to $2 \times D_p$ and/or a $D_p/E_c$ ratio of 10-50 ($\mu m \; cm^2$)/mJ.

Embodiment 2. The ink of Embodiment 1, wherein the ink has a print through depth ($D_{PT}$) at the wavelength $\lambda$ of less than or equal to $1.5 \times D_p$.

Embodiment 3. The ink of Embodiment 1 or Embodiment 2, wherein:
 the $D_p$ of the ink is 60-100 $\mu m$; and
 the $E_c$ of the ink is 2-4 mJ/cm$^2$.

Embodiment 4. The ink of Embodiment 1 or Embodiment 2, wherein:
 the $D_p$ of the ink is 101-150 $\mu m$; and
 the $E_c$ of the ink is 4-20 mJ/cm$^2$.

Embodiment 5. The ink of Embodiment 1 or Embodiment 2, wherein:
 the $D_p$ of the ink is 151-200 $\mu m$; and
 the $E_c$ of the ink is 8-15 mJ/cm$^2$.

Embodiment 6. The ink of any of the preceding Embodiments, wherein the ink has a ratio of $D_p$ to $E_c$, in units of ($\mu m \; cm^2$)/mJ, of between 10 and 50.

Embodiment 7. The ink of any of the preceding Embodiments, wherein the ink comprises up to 5 wt. % photoinitiator.

Embodiment 8. The ink of any of the preceding Embodiments, wherein:
 the ink comprises up to 5 wt. % photoinitiator and up to 0.5 wt. % non-curable absorber material; and
 the ratio of photoinitiator to non-curable absorber material, by weight, is between 5 and 100.

Embodiment 9. The ink of any of the preceding Embodiments, wherein both the non-curable absorber material and the photoinitiator have an absorption peak within 30 nm of the wavelength $\lambda$.

Embodiment 10. The ink of any of the preceding Embodiments, wherein the total absorbance of the non-curable absorber material at the wavelength $\lambda$ is about 0.1 to 10 times the total absorbance of the photoinitiator at the wavelength $\lambda$.

Embodiment 11. The ink of any of the preceding Embodiments, wherein the non-curable absorber material comprises pyrene.

Embodiment 12. The ink of any of the preceding Embodiments, wherein the non-curable absorber material comprises an oil-soluble yellow dye.

Embodiment 13. A method of forming a three-dimensional article by additive manufacturing, the method comprising:
 providing the ink of any of Embodiments 1-12; and
 selectively curing a portion of the ink using incident curing radiation having a Gaussian distribution of wavelengths and a peak wavelength at the wavelength $\lambda$.

Embodiment 14. The method of Embodiment 13, wherein:
 the ink is selectively cured according to preselected computer aided design (CAD) parameters; and
 the $D_p$ corresponds to a voxel depth of the CAD parameters.

Embodiment 15. The method of Embodiment 13 or Embodiment 14, wherein providing the ink comprises selectively depositing layers of the ink in a fluid state onto a substrate to form the three-dimensional article.

Embodiment 16. The method of any of Embodiments 13-15, wherein:
 providing the ink comprises retaining the ink in a fluid state in a container;
 selectively curing a portion of the ink comprises selectively applying the curing radiation to the ink in the container to solidify at least a portion of a first fluid layer of the ink, thereby forming a first solidified layer that defines a first cross-section of the article;
 raising or lowering the first solidified layer to provide a second fluid layer of the ink at a surface of the fluid ink in the container; and
 selectively applying the curing radiation to the ink in the container to solidify at least a portion of the second fluid layer of the ink, thereby forming a second solidified layer that defines a second cross-section of the article, the first cross-section and the second cross-section being bonded to one another in a z-direction.

Embodiment 17. A printed three-dimensional article formed from the ink of any of Embodiments 1-12 and/or using the method of any of Embodiments 13-16.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of forming a three-dimensional article by additive manufacturing, the method comprising:
    providing an ink; and
    selectively curing a portion of the ink using incident curing radiation having a Gaussian distribution of wavelengths and a peak wavelength at a wavelength $\lambda$, wherein the ink comprises
        up to 80 wt. % oligomeric curable material, based on the total weight of the ink;
        up to 80 wt. % monomeric curable material, based on the total weight of the ink;
        up to 10 wt. % photoinitiator, based on the total weight of the ink;
        up to 1 wt. % non-curable absorber material, based on the total weight of the ink; and
        up to 10 wt. % one or more additional components, based on the total weight of the ink,
    wherein the total amount of the oligomeric curable material, monomeric curable material, photoinitiator, non-curable absorber material, and one or more additional components is equal to 100 wt. %;
    wherein the photoinitiator is operable to initiate curing of the oligomeric curable material and/or the monomeric curable material when the photoinitiator is exposed to the incident curing radiation;
    wherein the ink has a penetration depth ($D_p$) and a critical energy ($E_c$) at the wavelength $\lambda$;
    wherein the $E_c$ of the ink is 10-30 mJ/cm$^2$; and
    wherein the ratio of $D_p$ to $E_c$, in units of ($\mu$m cm$^2$)/mJ, is between 10 and 50.

2. The method of claim 1, wherein:
    the ink is selectively cured according to preselected computer aided design (CAD) parameters;
    the $D_p$ corresponds to a voxel depth of the CAD parameters.

3. The method of claim 1, wherein providing the ink comprises selectively depositing layers of the ink in a fluid state onto a substrate to form the three-dimensional article.

4. The method of claim 1, wherein:
    providing the ink comprises retaining the ink in a fluid state in a container;
    selectively curing a portion of the ink comprises selectively applying the curing radiation to the ink in the container to solidify at least a portion of a first fluid layer of the ink, thereby forming a first solidified layer that defines a first cross-section of the article;
    raising or lowering the first solidified layer to provide a second fluid layer of the ink at a surface of the fluid ink in the container; and
    selectively applying the curing radiation to the ink in the container to solidify at least a portion of the second fluid layer of the ink, thereby forming a second solidified layer that defines a second cross-section of the article, the first cross-section and the second cross-section being bonded to one another in a z-direction.

5. The method of claim 1, wherein the $E_c$ of the ink is no greater than 60 mJ/cm$^2$.

6. The method of claim 1, wherein the $E_c$ of the ink is no greater than 50 mJ/cm$^2$.

7. The method of claim 1, wherein the $D_p$ of the ink is 151-200 $\mu$m.

8. The method of claim 1, wherein the ink comprises up to 5 wt. % photo initiator.

9. The method of claim 1, wherein:
    the ink comprises up to 5 wt. % photoinitiator and up to 0.5 wt. % non-curable absorber material; and
    the ratio of photoinitiator to non-curable absorber material, by weight, is between 5 and 100.

10. The method of claim 1, wherein both the non-curable absorber material and the photoinitiator have an absorption peak within 30 nm of the wavelength $\lambda$.

11. The method of claim 1, wherein the total absorbance of the non-curable absorber material at the wavelength $\lambda$ is about 0.1 to 10 times the total absorbance of the photoinitiator at the wavelength $\lambda$.

12. The method of claim 1, wherein the non-curable absorber material comprises a polycyclic aromatic compound.

13. The method of claim 1, wherein the non-curable absorber material comprises pyrene.

14. The method of claim 1, wherein the non-curable absorber material comprises an oil-soluble yellow dye.

15. The method of claim 1, wherein the photoinitiator comprises an alpha-cleavage type photoinitiator.

16. The method of claim 1, wherein the oligomeric curable material comprises (meth)acrylate moieties.

17. The method of claim 1, wherein the monomeric curable material comprises (meth)acrylate moieties.

18. A printed three-dimensional article formed from an ink comprising:
    up to 80 wt. % oligomeric curable material, based on the total weight of the ink;
    up to 80 wt. % monomeric curable material, based on the total weight of the ink;
    up to 10 wt. % photoinitiator, based on the total weight of the ink;
    up to 1 wt. % non-curable absorber material, based on the total weight of the ink; and
    up to 10 wt. % one or more additional components, based on the total weight of the ink,
    wherein the total amount of the oligomeric curable material, monomeric curable material, photoinitiator, non-curable absorber material, and one or more additional components is equal to 100 wt. %;
    wherein the photoinitiator is operable to initiate curing of the oligomeric curable material and/or the monomeric curable material when the photoinitiator is exposed to incident curing radiation having a Gaussian distribution of wavelengths and a peak wavelength $\lambda$;
    wherein the ink has a penetration depth ($D_p$) and a critical energy ($E_c$) at the wavelength $\lambda$;
    wherein the $E_c$ of the ink is 10-30 mJ/cm$^2$; and
    wherein the ratio of $D_p$ to $E_c$, in units of ($\mu$m cm$^2$)/mJ, is between 10 and 50.

* * * * *